Sept. 21, 1937. T. CLARK 2,093,955

RESILIENT DRIVE
Filed Nov. 2, 1936

INVENTOR
Thomas Clark
BY
Mawhinney & Mawhinney
ATTORNEYS.

Patented Sept. 21, 1937

2,093,955

UNITED STATES PATENT OFFICE 2,093,955

RESILIENT DRIVE

Thomas Clark, Coventry, England, assignor to Armstrong Siddeley Motors Limited, Coventry, England Application November 2, 1936, Serial No. 108,869
In Great Britain October 16, 1936

3 Claims. (Cl. 64—24)

My main object is to provide a satisfactory form of resilient drive to gearing for driving a supercharger of an aircraft engine; and the invention is restricted to the combination, with such gearing, of the resilient coupling, the essential requirements of which are lightness, compactness and reliability. The invention does not relate to resilient couplings for use in motorcycles, etc.

According to the invention, the resilient coupling, to be combined with the gearing, includes driving and driven rings, one of which, preferably the driving ring, is axially slidable, with intermeshing inclined teeth which preferably extend axially of the rings in a manner known per se, and a dished annular spring, or preferably a pair of oppositely-dished annular springs, urging the rings towards one another.

In the accompanying drawing, illustrating the invention:—

Figure 1:
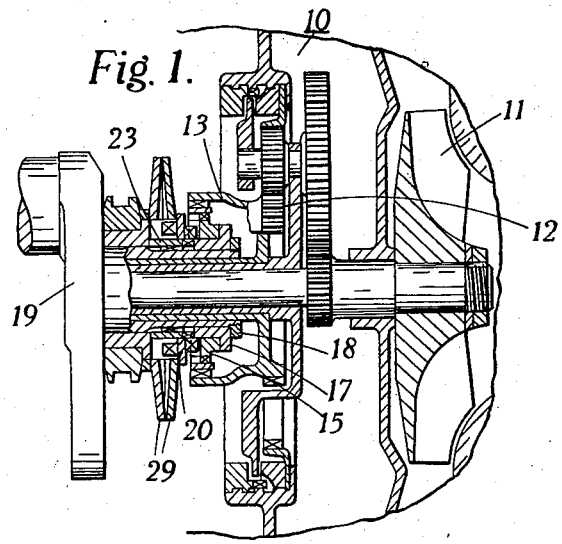
Figure 1 is a fragmentary diagrammatic sectional elevation of a resilient coupling in the drive to gearing for driving the impellor of an aircraft engine supercharger.
Figure 2:
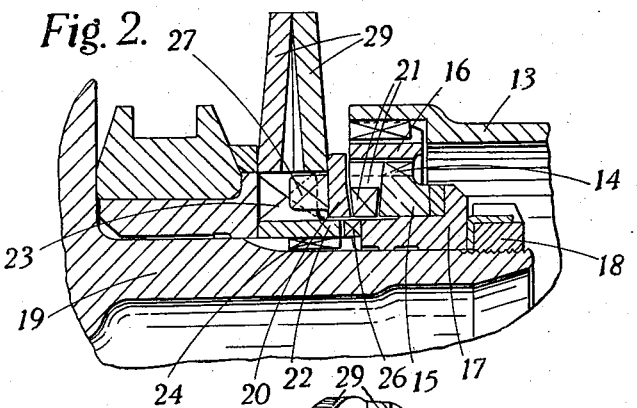
Figure 2 is a fragmentary sectional elevation, to a larger scale, of the resilient coupling.

In the construction illustrated, gearing 10 through which a supercharger impellor 11 is to be driven is of the form described in the specifications of co-pending patent applications Nos. 108,867 and 108,868 of Gerard M. Cutler, such gearing being driven from an external ring of teeth 12 at one end of a sleeve 13. The other end of the sleeve is placed in mesh with the teeth 14 of the driven ring 15 of the resilient coupling through an annulus 16 which is in turn formed with appropriate external and internal teeth. Movement of the ring 15 to the right is prevented by its engagement with a flanged sleeve 17 which in turn abuts a nut 18 screwed on the end of the crankshaft 19.

Figure 3:
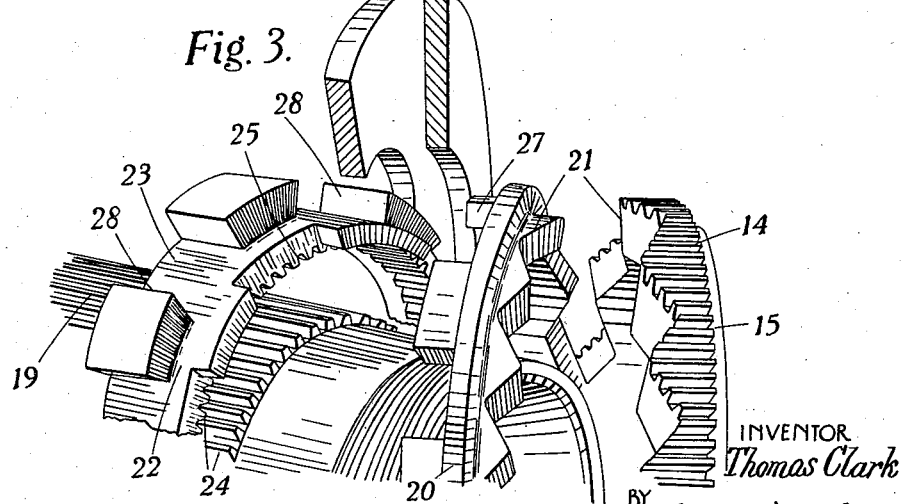
Figure 3 is a perspective view of the main parts thereof with these parts dismantled.

20 represents the driving ring of the coupling and both the rings, as will be seen from Figure 3, are formed with axially-extending inclined teeth 21 which interfit in a manner known per se. The driving ring 20 is supported in this way and mounted round a flange 22 of a ring 23 which has at 24 a splined connection with the crankshaft and which is axially located thereon. Notches 25 are formed in the flange of the ring 23 to receive teeth 26 on the flanged sleeve 17 whereby to hold the latter against rotation on the crankshaft. The driving connection between the ring 23 and the driving ring 20 includes axially-extending dogs 27 on the driving ring which slidably engage notches 28 on the periphery of the ring 23. The urging of the driving and driven rings towards one another is effected by means of a pair of oppositely-dished annular spring washers 29 which are mounted and arranged as shown.

In this way we provide a resilient drive which is of great strength for its weight and very compact. The axial movement allowed to the driving ring 20 is insufficient for the interfitting teeth 21 ever to come out of mesh, but sudden variations of engine torque can cause a partial angular movement between the driving and driven rings against the pressure of the springs 29, whereby the gearing is relieved, to a considerable extent, of shock arising from such sudden variations.

What I claim as my invention and desire to secure by Letters Patent of the United States is:—

1. A resilient drive for connecting a drive shaft with the gearing of aircraft superchargers, comprising a ring splined to the drive shaft and secured against movement axially inward of the shaft, said ring having radially formed teeth on its outer face and axially formed teeth on its side next the free end of the drive shaft, a driving ring slidable on said splined ring and having teeth to engage the radial teeth of the splined ring to rotate therewith, said driving ring having axially formed teeth with oppositely inclined faces on its side next the free end of the drive shaft, a driven ring on said drive shaft endwards of the splined ring and the driving ring and having axially formed teeth with oppositely inclined faces on its side next the driving ring and intermeshing with the pointed teeth thereof, a flanged sleeve on the drive shaft on the sleeve portion of which the driven ring is rotatably mounted and against the flange of which the driven ring abuts, said flanged sleeve having axially formed teeth intermeshing with said axially formed teeth on the splined ring to rotate the sleeve with the ring, means at the outer end of the drive shaft to secure the flanged sleeve against endward motion, and a spring urging the driving ring against the driven ring yieldably to hold the teeth in intermeshed relation.

2. A resilient drive for connecting a drive shaft with the gearing of aircraft superchargers, comprising a ring splined to the drive shaft and held against movement axially inward of the shaft, said ring having radially formed teeth on its outer face, a driving ring slidable on said splined ring and having teeth to engage the radial teeth of said splined ring to rotate therewith, said driving ring having on the outer side axially formed teeth with converging faces, a driven ring rotatably mounted on said drive shaft outwardly of said driving ring and having on its inner side teeth with converging faces adapted to intermesh with the teeth on the side of said driving ring, means for retaining said driven ring on the drive shaft against outward movement, and a pair of oppositely-dished annular springs with their peripheries abutting and with the central part of one spring held against inward movement on the drive shaft and the central part of the other spring abutting said driving ring to urge the same outwardly and yieldingly to hold the driving and driven rings in intermeshing relation.

3. A resilient drive for connecting a drive shaft with the gearing of aircraft superchargers, comprising a ring splined to the drive shaft, said ring having radially formed teeth on its outer face, means including an outstanding flange for holding the splined ring against movement inwardly of the shaft, a driving ring slidably mounted on said splined ring and having teeth to engage the radial teeth of said splined ring, said driving ring having an outstanding flange and further having on the outer side axially formed teeth with converging faces, a driven ring rotatably mounted on said drive shaft outwardly of said driving ring and having on its inner side teeth with converging faces adapted to intermesh with the teeth on the side of said driving ring, means for retaining said driven ring on the drive shaft against outward movement, and a pair of oppositely-dished annular springs with their peripheries abutting and the central part of one spring disposed against the flange on the splined ring holding means and the central part of the other spring disposed against the flange on said driving ring, said springs acting to urge the driving and driven rings together and yieldingly to hold them in intermeshing relation.

THOMAS CLARK.